(12) United States Patent
Matta et al.

(10) Patent No.: US 11,768,531 B2
(45) Date of Patent: Sep. 26, 2023

(54) POWER MANAGEMENT FOR STORAGE CONTROLLERS

(71) Applicant: Western Digital Technologies, Inc., San Jose, CA (US)

(72) Inventors: Dinesh Matta, Bangalore (IN); Raghu Voleti, Bangalore (IN); Sitaram Banda, Bangalore (IN); Mikael Mortensen, Milpitas, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 10 days.

(21) Appl. No.: 17/565,928

(22) Filed: Dec. 30, 2021

(65) Prior Publication Data

US 2023/0213997 A1   Jul. 6, 2023

(51) Int. Cl.
*G06F 1/324* (2019.01)
*G06F 1/08* (2006.01)

(52) U.S. Cl.
CPC ............... *G06F 1/324* (2013.01); *G06F 1/08* (2013.01)

(58) Field of Classification Search
CPC .................................. G06F 1/324; G06F 1/08
See application file for complete search history.

(56) References Cited

U.S. PATENT DOCUMENTS

| | | | | |
|---|---|---|---|---|
| 7,969,809 B2 * | 6/2011 | Ben-Rubi | ................. | G11C 5/14 365/226 |
| 8,812,808 B2 | 8/2014 | Eyerman et al. | | |
| 9,467,149 B2 * | 10/2016 | Chalasani | ............ | H04L 25/0276 |
| 10,254,782 B2 * | 4/2019 | He | ........................ | G11C 7/222 |
| 10,514,748 B2 * | 12/2019 | Tidwell | .................... | G06F 1/324 |
| 10,534,546 B2 | 1/2020 | Benisty et al. | | |
| 11,502,693 B2 * | 11/2022 | Zhang | ..................... | G06F 1/324 |
| 2004/0068640 A1 * | 4/2004 | Jacobson | .............. | G06F 1/3203 712/E9.063 |
| 2007/0234091 A1 * | 10/2007 | Vishin | ................... | G06F 9/4893 712/E9.049 |
| 2014/0380071 A1 * | 12/2014 | Lee | ....................... | G06F 1/3206 713/321 |
| 2015/0067384 A1 * | 3/2015 | Rozario | ................... | G06F 13/00 713/502 |
| 2015/0198967 A1 * | 7/2015 | Wang | ..................... | G06F 1/324 713/600 |
| 2016/0041594 A1 * | 2/2016 | Hanson | ................. | G06F 1/3243 713/320 |
| 2016/0342192 A1 * | 11/2016 | Shearer | ................. | G06F 1/3237 |
| 2016/0370841 A1 * | 12/2016 | Erez | ..................... | G06F 3/0604 |
| 2017/0117895 A1 * | 4/2017 | Clark | ................. | H03K 19/0963 |
| 2017/0351318 A1 * | 12/2017 | Gu | ...................... | G06F 9/30145 |

(Continued)

*Primary Examiner* — Aurel Prifti
(74) *Attorney, Agent, or Firm* — Barry IP Law, P.C.

(57) ABSTRACT

A storage controller includes a plurality of pipeline stages configured to process data. A system clock signal is received that has a system frequency and at least one performance metric is determined for one or more pipeline stages of the plurality of pipeline stages. A first clock signal is generated having a first frequency for operation of a first pipeline stage of the plurality of pipeline stages. Based at least in part on the at least one determined performance metric, a second clock signal is generated having a second frequency for operation of a second pipeline stage of the plurality of pipeline stages. The second frequency is less than the system frequency and may also differ from the first frequency.

20 Claims, 5 Drawing Sheets

(56) References Cited

U.S. PATENT DOCUMENTS

| | | | |
|---|---|---|---|
| 2017/0357302 A1* | 12/2017 | Dorsey | G06F 1/3206 |
| 2018/0349175 A1* | 12/2018 | Andrus | G06F 9/3851 |
| 2018/0356996 A1* | 12/2018 | Benisty | G06F 3/0653 |
| 2019/0041950 A1 | 2/2019 | Chynoweth et al. | |
| 2019/0094938 A1* | 3/2019 | Tidwell | G06F 1/3275 |
| 2019/0384348 A1* | 12/2019 | Srinivasan | G06F 1/3203 |
| 2019/0384370 A1* | 12/2019 | Kim | G06F 9/3004 |
| 2020/0409856 A1* | 12/2020 | Navon | G06F 12/123 |
| 2021/0065755 A1* | 3/2021 | Kim | G06F 13/1621 |
| 2021/0096755 A1* | 4/2021 | Rajgopal | G06F 3/061 |
| 2021/0151085 A1* | 5/2021 | Kim | G06F 13/1689 |
| 2021/0191725 A1* | 6/2021 | Carlson | G06F 9/3869 |

* cited by examiner

POWER MANAGEMENT FOR STORAGE CONTROLLERS

BACKGROUND

With the increasing use of mobile electronic devices, conserving power or battery life has become increasingly important. Many electronic devices include some form of power management, however, this power management typically only applies to a main processor or host portion of the electronic device and not to the storage controller or Data Storage Device (DSD) portion of the electronic device during an active state. For example, the power consumption of a smartphone processor may be regulated by an Operating System (OS) of the host by decreasing or increasing the clock signal for the main processor based on processing demand. However, conventional storage controllers, unlike the main processor, lack the capability to scale its clock signal during an active state. The host data traffic will typically vary greatly during operation, but the storage controller is not able to predict the changes in data traffic. Conventional storage controllers therefore run at a peak frequency during active states to accommodate the highest data traffic patterns. This results in power inefficiencies and lost power savings when data traffic is lower for the storage controller.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown or described in detail to avoid unnecessarily obscuring the various embodiments.

Example Systems

Figure 1:
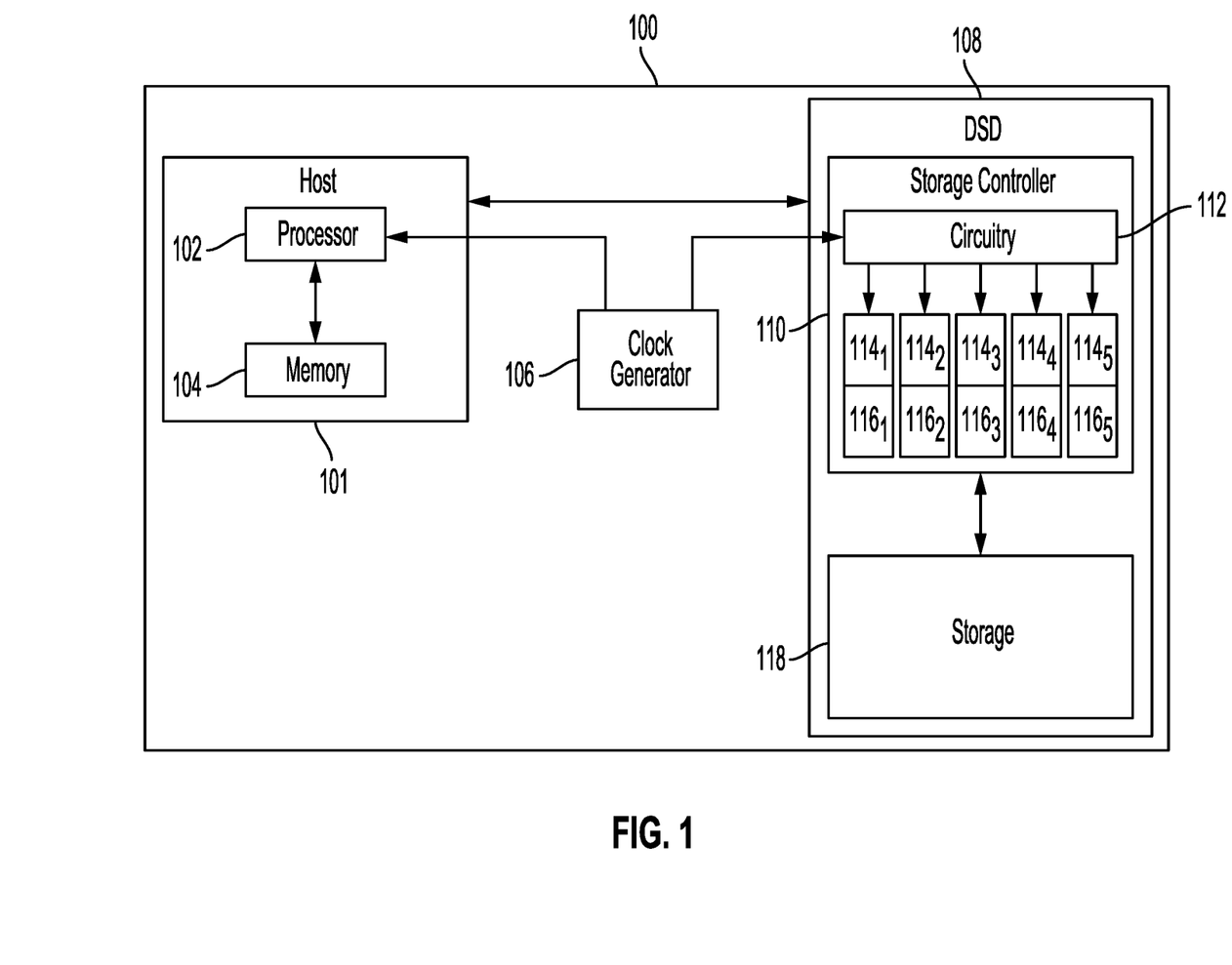
FIG. 1 is a block diagram of an example system including a host and a Data Storage Device (DSD) according to one or more embodiments.

FIG. 1 is a block diagram of example system 100 including host 101, clock generator 106, and Data Storage Device (DSD) 108 according to one or more embodiments. In the example of FIG. 1, host 101 communicates with DSD 108 to retrieve data from and store data in storage 118 of DSD 108. Host 101 and DSD 108 may be separate devices or may be housed together as part of a single electronic device, such as, for example, a server, computing device, embedded device, desktop, laptop or notebook computer, or other type of electronic device such as a tablet, smartphone, network media player, portable media player, television, digital camera, or Digital Video Recorder (DVR). As used herein, a host can refer to a device that can issue commands to a DSD to store data or retrieve data. In this regard, host 101 may include another storage device such as a smart DSD that can execute applications and communicate with other DSDs.

In the example of FIG. 1, host 101 includes processor 102 for executing computer-executable instructions, such as applications, which can include, for example, an Operating System (OS) of host 101. Processor 102 can include circuitry such as one or more processors for executing instructions and can include, for example, a Central Processing Unit (CPU), a Graphics Processing Unit (GPU), a microcontroller, a Digital Signal Processor (DSP), an Application Specific Integrated Circuit (ASIC), a Field Programmable Gate Array (FPGA), hard-wired logic, analog circuitry and/or a combination thereof. In some implementations, processor 102 can include a System on a Chip (SoC). In this regard, those of ordinary skill in the art will appreciate that processor 102, memory 104, and/or clock generator 106 may be combined into a single component or casing in some implementations.

In the example of FIG. 1, processor 102 can access memory 104 to execute instructions, such as instructions from applications and/or data used in executing instructions from one or more applications. In some implementations, memory 104 can be a volatile memory, such as a Dynamic Random Access Memory (DRAM) or Static Random Access Memory (SRAM). In other implementations, memory 104 can include, for example, a Storage Class Memory (SCM) such as Magnetoresistive RAM (MRAM) or 3D XPoint memory.

Clock generator 106 can include, for example, an oscillator circuit that provides a system clock signal for components in system 100. As discussed in more detail below, storage controller 110 of DSD 108 can receive this clock signal and generate different clock signals for different pipeline stages 114 based on at least one performance metric and the system clock signal. As shown in FIG. 1, clock generator 106 also provides the system clock signal to processor 102, which may also generate a clock signal for processor 102 based on performance demands on host 101.

As will be appreciated by those of ordinary skill in the art, host 101 and DSD 108 may communicate via a bus or interconnect. In some implementations, host 101 and DSD 108 may communicate using a standard, such as, for example, Universal Flash Storage (UFS), Serial Advanced Technology Attachment (SATA), PCI express (PCIe), Small Computer System Interface (SCSI), Serial Attached SCSI (SAS), Ethernet, or Fibre Channel. In addition, host 101 and DSD 108 may also interface using a logical interface specification such as UFS Host Controller Interface (UFSHCI), Non-Volatile Memory express (NVMe), or Advanced Host Controller Interface (AHCI).

As shown in FIG. 1, DSD 108 includes storage controller 110 and storage 118 that provides non-volatile storage of data. Storage controller 110 includes circuitry 112 that operates as a control unit of storage controller 110 to control operation of pipeline stages $114_1$ to $114_5$ and the respective memories $116_1$ to $116_5$ of the pipeline stages 114. Circuitry 112 can include circuitry such as one or more processors for executing instructions and can include, for example, a CPU, a GPU, a microcontroller circuitry, a DSP, an ASIC, an FPGA, hard-wired logic, analog circuitry and/or a combination thereof. In some implementations, controller circuitry 112 can include an SoC.

As discussed in more detail below with reference to FIG. 2, circuitry 112 in the present disclosure can include circuitry for monitoring performance of some and/or all of pipeline stages 114 and generating clock signals to operate pipeline stages 114 at different frequencies to reduce the power consumed by storage controller 110 during active states.

Memories 116 can include, for example, registers, SRAM, or cache memory that are used by pipeline stages 114 to process data through a data path. For example, storage controller 110 may follow an Instruction Set Architecture (ISA), such as ARM or Reduced Instruction Set Computer V (RISC-V), for example, that may specify the function of different pipeline stages 114. In this regard, each pipeline stage 114 may have a dedicated function, such as fetching data, decoding data, or performing operations on data. Those of ordinary skill in the art will appreciate with reference to the present disclosure that a different number or arrangement of pipeline stages 114 and/or memories 116 may be used in storage controller 110 than shown in FIG. 1.

Storage 118 includes a non-volatile memory that is accessed by storage controller 110 for processing commands received from host 101 or for performing maintenance operations on storage 118, such as wear leveling or garbage collection. In some implementations, storage 118 can be a solid-state memory, such as where DSD 108 is a Solid-State Drive (SSD). In other implementations, storage 118 may include a different type of non-volatile storage media, such as one or more rotating magnetic disks, as in the case where DSD 108 is a Hard Disk Drive (HDD). Some implementations of DSD 108 may include multiple types of non-volatile storage media, such as where DSD 108 is a Solid-State Hybrid Drive (SSHD) that includes at least one rotating magnetic disk in addition to solid-state memory.

While the description herein refers to solid-state memory generally, it is understood that solid-state memory may comprise one or more of various types of memory devices such as flash integrated circuits, Chalcogenide RAM (C-RAM), Phase Change Memory (PCM), Programmable Metallization Cell RAM (PMC-RAM or PMCm), Ovonic Unified Memory (OUM), Resistive RAM (RRAM), Ferroelectric Memory (FeRAM), MRAM, Fast NAND, 3D-XPoint memory, NAND memory (e.g., Single-Level Cell (SLC) memory, Multi-Level Cell (MLC) memory (i.e., two or more levels), or any combination thereof), NOR memory, EEPROM, other discrete Non-Volatile Memory (NVM) chips, or any combination thereof.

Those of ordinary skill in the art will appreciate that other implementations can include more or less than the elements shown in FIG. 1, and that the processes disclosed herein may be implemented in other systems. For example, other implementations of system 100 can include clock generator 106 as part of host 101 or may include many more pipeline stages 114 than those shown in FIG. 1.

Figure 2:
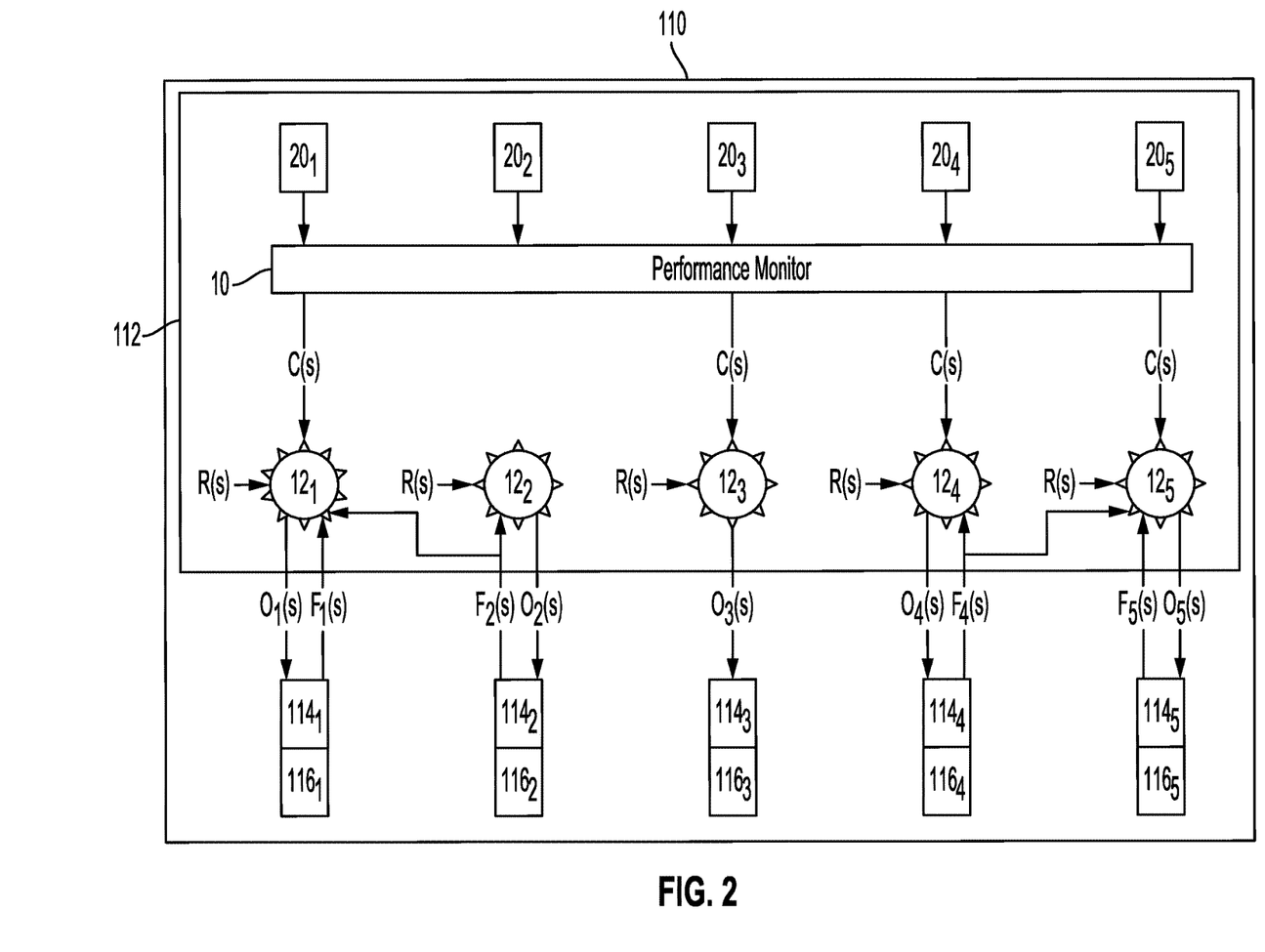
FIG. 2 is a block diagram of a storage controller according to one or more embodiments.

FIG. 2 is an example block diagram of storage controller 110 according to one or more embodiments. In the example of FIG. 2, circuitry 112 includes pipeline control modules $20_1$ to $20_5$ for controlling operation of respective pipeline stages $114_1$ to $114_5$, performance monitor 10 for determining or measuring one or more performance metrics of pipeline stages 114, and gearboxes $12_1$ to $12_5$ for generating, adjusting, or setting a clock signal for performing operations by a respective pipeline stage $114_1$ to $114_5$. In some implementations, gearboxes 12 can include state machines that can scale up and scale down the frequency of their respective output clock signals O(s) to pipeline stages 114.

In the example of FIG. 2, gearbox $12_1$ provides a first output clock signal $O_1(s)$ to pipeline stage $114_1$. Each gearbox 12 uses an algorithm to scale the frequency of its output clock signal, O(s). As shown in FIG. 2, the inputs used by each gearbox 12 can differ based on the different functions performed by its associated pipeline stage 114, such as a fetching function, a decoding function, or an arithmetic function. As discussed in more detail below, each gearbox can scale down the frequency of the system clock signal R(s), which may be received from clock generator 106 in FIG. 1, to reduce the power consumed by its respective pipeline stage to a threshold level allowed by the performance metric or performance metrics associated with the particular function of the pipeline stage.

For example, gearbox $12_1$ uses a system clock signal R(s) and scales down the frequency of output clock signal $O_1(s)$ based on performance feedback $F_1(s)$ from current pipeline stage $114_1$, performance feedback $F_2(S)$ from next pipeline stage $114_2$, and an overall performance metric C(s) for all the pipeline stages 114 that is received from performance monitor 10. In this regard, output clock signal $O_1(s)$ may be represented as a function of these inputs as $O_1(s)=f\{R(s), C(s), F_1(s), F_2(s)\}$.

In contrast, gearbox 122 uses the system clock signal R(s) and performance feedback $F_2(s)$ from current pipeline stage $114_2$, without using the overall performance feedback C(s) or performance feedback from a next pipeline stage (i.e., performance feedback from pipeline stage $114_3$). In this regard, the function of pipeline stage $114_1$, such as fetching data, may affect the performance of a next pipeline stage (i.e., pipeline stage $114_2$) more than the function of pipeline stage $114_2$, such as decoding, so that the frequency scaling of $O_2(s)$ does not depend on performance feedback from the next pipeline stage $114_3$. The inputs used to scale the clock signal frequencies of different pipeline stages can be set for particular use cases and may be weighted differently depending on the function of the pipeline stage or the specific use of the storage controller.

Gearbox $12_3$, on the other hand, scales the frequency of system clock signal R(s) based only on the overall performance metric C(s) in providing output clock signal $O_3(s)$ to pipeline stage $114_3$. Gearbox $12_4$ scales the frequency of system clock signal R(s) based on the overall performance metric C(s) and performance feedback from current pipeline stage $114_4$ in providing output clock signal $O_4(s)$ to pipeline stage $114_4$. Gearbox $12_5$ scales the frequency of system clock signal R(s) based on the overall performance metric C(s), performance feedback $F_4(s)$ from previous pipeline stage $114_4$, and performance feedback $F_5(s)$ from current pipeline stage $114_5$ in providing output clock signal $O_5(s)$ to pipeline stage $114_5$.

In some implementations, the overall performance metric C(s) can indicate an overall throughput of commands processed by pipeline stages $114_1$ to $114_5$. The throughput of a pipeline stage 114 or the overall throughput of pipeline stages 114 can represent an instantaneous, real-time, or current throughput of processed commands and/or an average throughput of commands over a period of time. In some cases, a throughput for the one or more pipeline stages can indicate a proportion or percentage of processed commands versus pending commands to be processed by the one or more pipeline stages.

As discussed above, the performance metrics can include one or more of an overall or end-to-end throughput of commands processed by all of the pipeline stages 114, a throughput of commands processed by a current pipeline stage $114_n$, a throughput of commands processed by a previous pipeline stage $114_{n-1}$, a throughput of commands processed by a next pipeline stage $114_{n+1}$, an overall number of pending commands to be processed by the plurality of pipeline stages 114, a number of pending commands to be processed by the current pipeline stage $114_n$, a number of pending commands to be processed by the previous pipeline stage $114_{n-1}$, and a number of pending commands to be processed by the next pipeline stage $114_{n+1}$.

Unlike conventional storage controllers where all the pipeline stages run at a maximum frequency irrespective of the data traffic during active states, circuitry 112 of storage controller 110 iteratively seeks to decelerate the clock signals provided to pipeline stages 114 during active states and only increases the frequency of the clock signals based on one or more performance metrics (e.g., overall throughput C(s), a current pipeline stage throughput $F_n(s)$, a next pipeline stage throughput $F_{n+1}(s)$, and/or a previous pipeline stage throughput $F_{n-1}(s)$) not satisfying or meeting a threshold value. In addition, circuitry 112 attempts to independently decelerate or reduce the frequencies of the clock signals used by the different pipeline stages 114 until performance has deteriorated to a certain level that may be tailored to the function of the pipeline stage. This results in improved balancing of pipeline stage delays, while saving power for non-throughput intensive traffic profiles.

As those of ordinary skill in the art will appreciate with reference to the present disclosure, the arrangement of components or modules in FIG. 2 for storage controller 110 may differ in other implementations. For example, other implementations may include a different number of pipeline stages and corresponding gearboxes 12 and memories 116. As another example variation, performance monitor 10 may include separate performance monitors for each pipeline stage 114 or control modules $20_1$ to $20_5$ may be condensed into a single control module that controls operation of the different pipeline stages 114.

Example Processes

Figure 3:
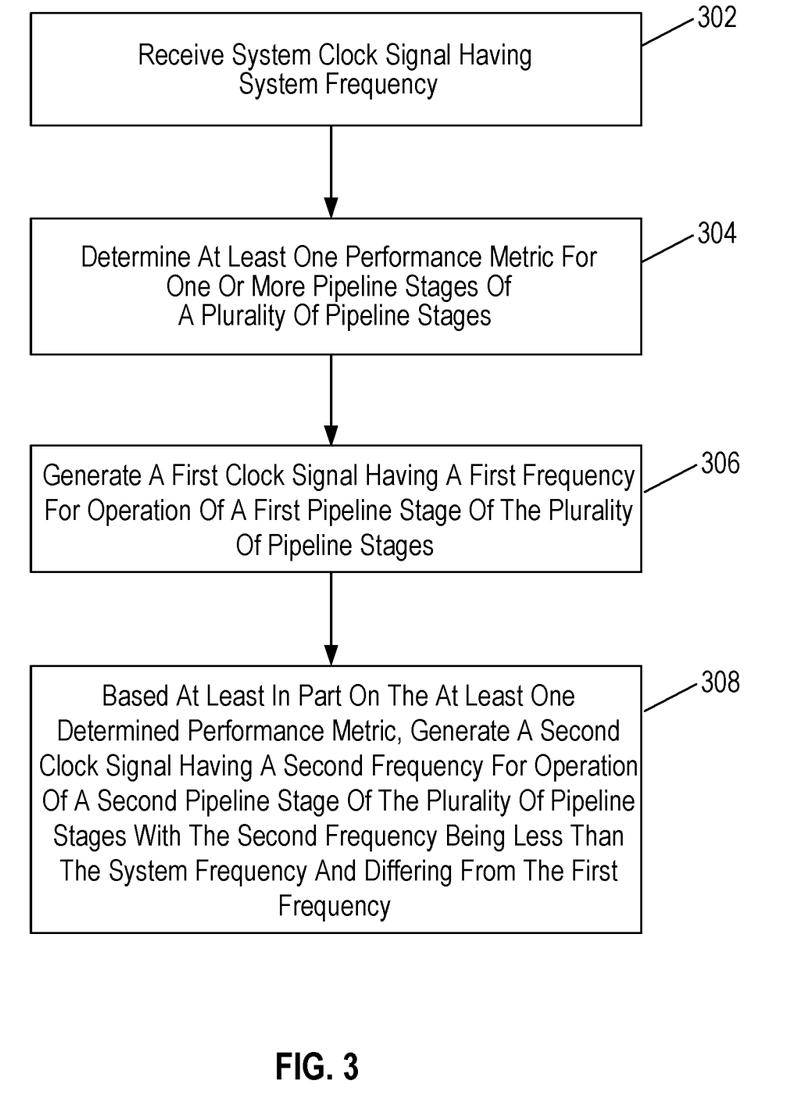
FIG. 3 is a flowchart for a clock signal adjustment process according to one or more embodiments.

FIG. 3 is a flowchart for a clock signal adjustment process according to one or more embodiments. The process of FIG. 3 can be performed by, for example, circuitry 112 of storage controller 110 in FIGS. 1 and 2.

In block 302, the circuitry receives a system clock signal (e.g., R(s) in FIG. 2) having a system frequency. In some implementations, the system clock signal may be generated by a clock generator for a system that includes the DSD and the host (e.g., clock generator 106 in FIG. 1).

In block 304, the circuitry determines at least one performance metric for one or more pipeline stages of a plurality of pipeline stages of the storage controller. In some implementations, a performance monitor may measure performance metrics, such as throughput and pending commands, for each pipeline stage and collectively for all the pipeline stages.

In block 306, the circuitry generates a first clock signal having a first frequency for operation of a first pipeline stage of the plurality of pipeline stages. As in the example of FIG. 2 discussed above, a particular gearbox or module of the circuitry can be configured to generate the first clock signal for the corresponding first pipeline stage. The generation of the clock signal can including scaling down the system clock signal based on one or more inputs including, for example, an overall throughput of commands processed by the plurality of pipeline stages, a throughput of commands processed by a current pipeline stage, a throughput of commands processed by a previous pipeline stage, a throughput of commands processed by a next pipeline stage, an overall number of pending commands to be processed by the plurality of pipeline stages, a number of pending commands to be processed by the current pipeline stage, a number of pending commands to be processed by the previous pipeline stage, and/or a number of pending commands to be processed by the next pipeline stage.

In block 308, the circuitry generates a second clock signal having a second frequency for operation of a second pipeline stage. In the example of FIG. 3, the second frequency is less than the system frequency and differs from the first frequency of the first clock signal generated in block 306. As with block 306, a particular gearbox or module of the circuitry can be configured to generate the second clock signal for the corresponding second pipeline stage. In this regard, the second pipeline stage can operate at a lower frequency or at a higher frequency than the first pipeline stage, while still operating at a lower frequency than the system frequency of the system clock signal.

Those of ordinary skill in the art will appreciate with reference to the present disclosure that the order of blocks for the clock signal adjustment process of FIG. 3 may differ in other implementations. For example, the reception of the system clock signal in block 302, the generation of the first clock signal in block 306, and/or the generation of the second clock signal in block 308 may be concurrent and need not occur sequentially. In this regard, the process of FIG. 3 can be a continual or iterative process during an active state of the storage controller.

Figure 4:
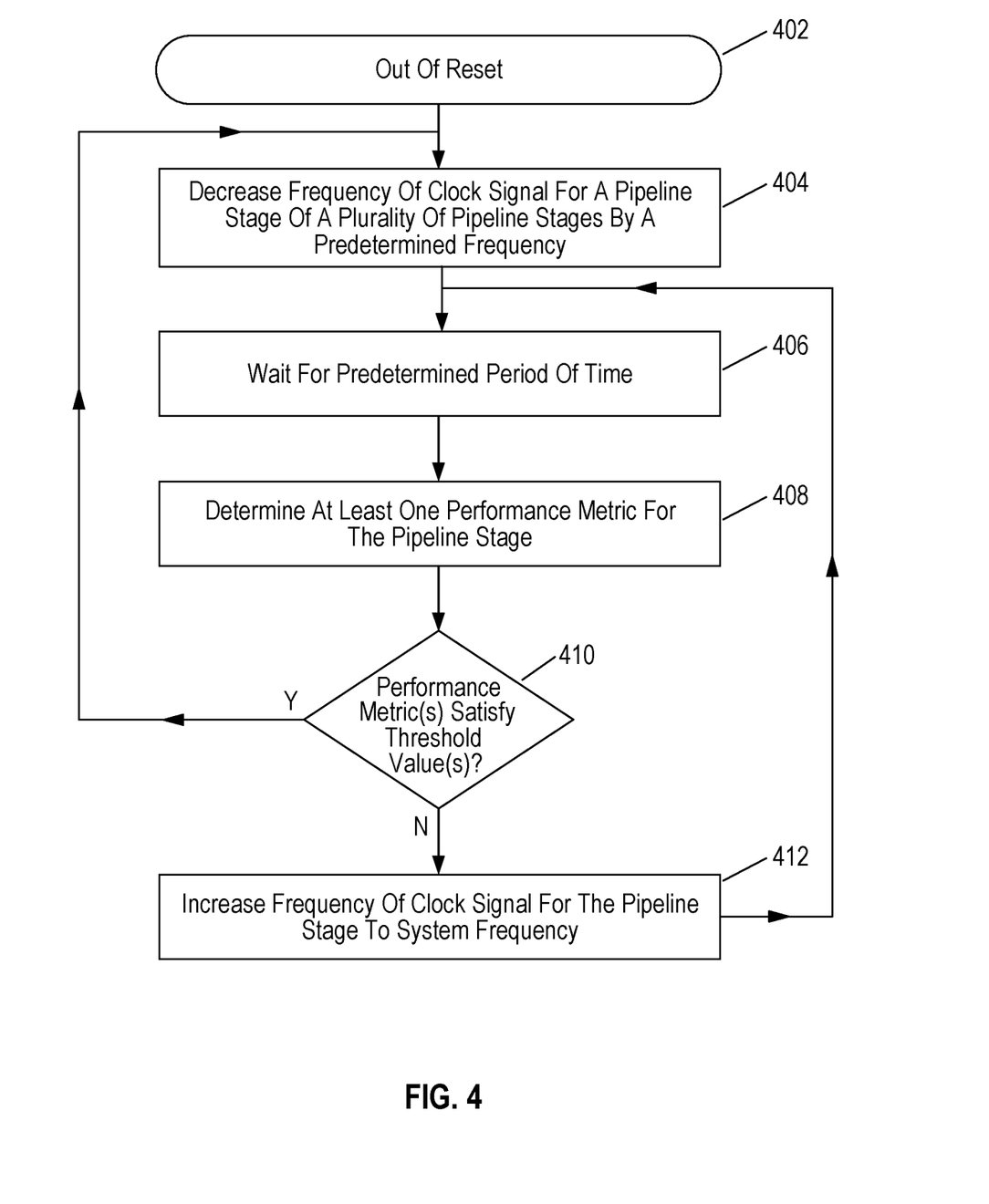
FIG. 4 is a flowchart for a clock signal adjustment process for a pipeline stage according to one or more embodiments.

FIG. 4 is a flowchart for a clock signal adjustment process for a pipeline stage according to one or more embodiments. The process of FIG. 4 can be performed by, for example, circuitry 112 of storage controller 110 in FIGS. 1 and 2.

In block 402, the storage controller exits a reset, which may occur when the storage controller shifts from an idle state, such as during a low power mode of the system to an active state or following a power up of the system.

In block 404, the circuitry decreases the frequency of a clock signal for a pipeline stage of the storage controller by a predetermined frequency. For example, a gearbox of the circuitry may mask or puncture a certain number of clock cycles of a system clock signal, such as by masking one clock cycle out of sixteen clock cycles.

In block 406, the circuitry waits for a predetermined amount of time to allow for the decreased frequency of the clock signal to take effect. In block 408, the circuitry determines at least one performance metric for the pipeline stage. In some implementations, a performance monitor for the pipeline stage may determine one or more performance metrics such as a throughput for the pipeline stage, which may indicate, for example, a number of commands processed by the pipeline stage during the predetermined period of time in block 406. The throughput can include at least one of a current throughout and an average throughput for the pipeline stage.

In other cases, the one or more performance metrics determined in block 406 can indicate a ratio or other comparison of the number of processed commands during the predetermined period of time to the total number of commands waiting to be processed by the pipeline stage during the predetermined period of time. As discussed above, other performance metrics can include an overall or end-to-end throughput of commands processed by all of the pipeline stages of the storage controller and/or a number of pending commands to be processed by the pipeline stage.

In block 410, the circuitry determines whether any of the at least one performance metrics do not satisfy respective threshold values. If it is determined that the one or more performance metrics determined in block 408 satisfy respective threshold values, the process returns to block 404 to further decrease the frequency of the clock signal by the predetermined frequency. For example, if the throughput for the pipeline stage is determined to be greater than a threshold value for the throughput and a number of pending commands is determined to be less than another threshold value, the process returns to block 404 to further decrease the frequency of the clock signal by the predetermined frequency (e.g., masking a second clock cycle out of sixteen clock cycles of the system clock signal). In some implementations, the clock cycles can be evenly masked within a certain number of clock cycles to provide a more uniform decrease in the frequency.

On the other hand, if it is determined in block 410 that one or more of the at least one determined performance metrics do not satisfy a threshold value, the circuitry in block 412 increases the frequency of the clock signal for the pipeline stage to the full system frequency. The increase in frequency may occur as an interrupt, for example, to improve the performance of the pipeline stage to satisfy the threshold value.

The process of FIG. 4 then returns to block 406 to wait for the predetermined period of time for the increased frequency to take effect. The circuitry then compares the at least one performance metric in block 410 to determine whether the frequency can be reduced again by the predetermined frequency in block 404. In this regard, the clock signal adjustment process of FIG. 4 seeks to iteratively or continually decrease the frequency of the clock signal for the pipeline stage until a threshold value for a performance metric for the pipeline stage is no longer satisfied. The power consumed by the pipeline stage is therefore reduced while maintaining an acceptable level of performance for the pipeline stage.

Those of ordinary skill in the art will appreciate with reference to the present disclosure that the order of blocks for the clock signal adjustment process of FIG. 4 may differ in other implementations. For example, in some implementations, the circuitry may not wait for a predetermined period of time in block 406 and may determine the at least one performance metric for the pipeline stage immediately after decreasing the frequency of the clock signal in block 404 or increasing the frequency of the clock signal in block 412.

Figure 5:
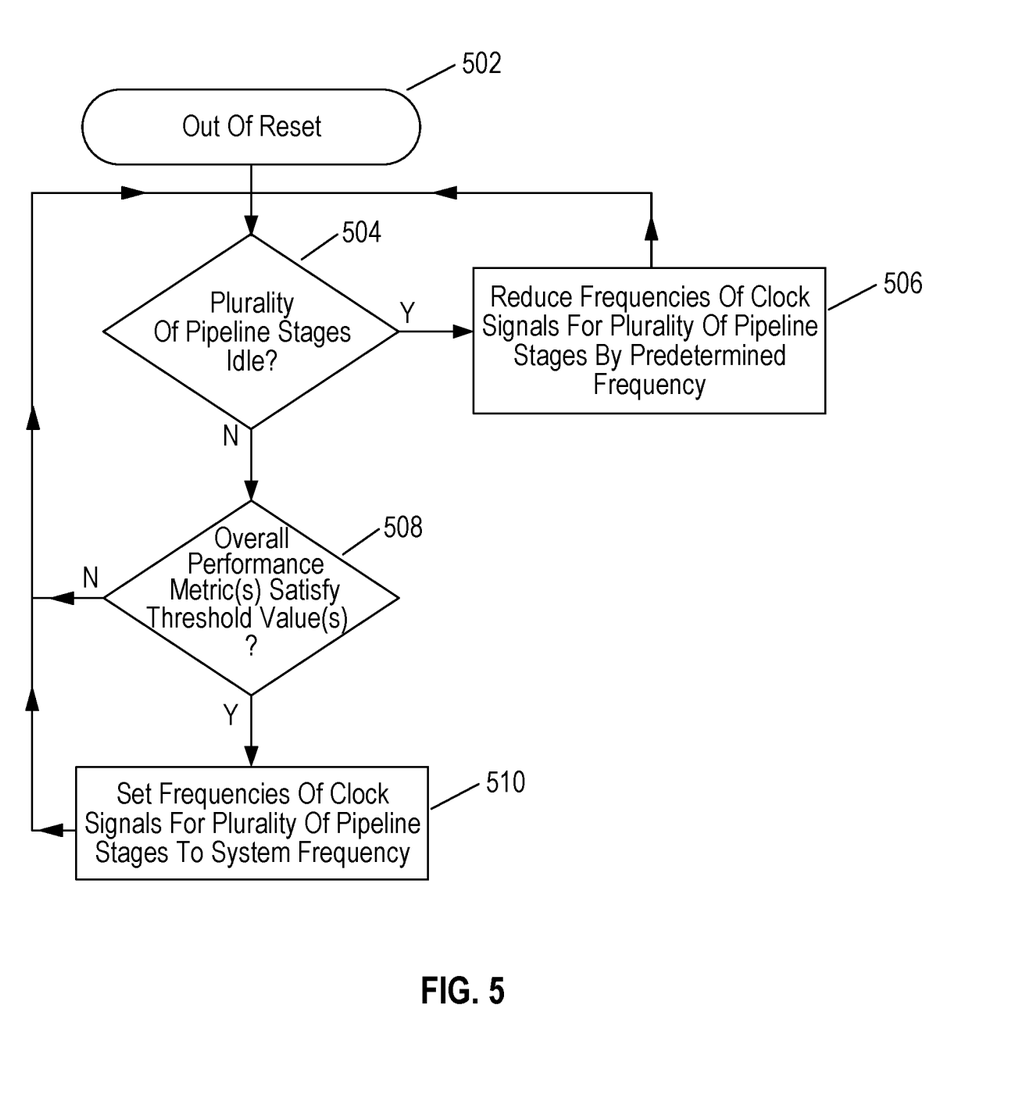
FIG. 5 is a flowchart for a clock signal adjustment process for a plurality of pipeline stages according to one or more embodiments.

FIG. 5 is a flowchart for a clock signal adjustment process for a plurality of pipeline stages according to one or more embodiments. The process of FIG. 5 can be performed by, for example, circuitry 112 of storage controller 110 in FIGS. 1 and 2. In addition, the process of FIG. 5 may run concurrently for all the pipeline stages of a storage controller, while a different process, such as the processes of FIG. 3 or 4, may run independently for each pipeline stage.

In block 502, the storage controller exits a reset, which may occur when the storage controller shifts from an idle state, such as during a low power mode of the system to an active state or after a system power up.

In block 504, the circuitry determines whether the pipeline stages of the storage controller are idle. If so, the circuitry reduces the frequencies of the clock signals for the pipeline stages by a predetermined frequency, such as by masking or puncturing the clock cycles of the system clock signal by half and supplying the reduced clock signal to each of the pipeline stages.

On the other hand, if it is determined in block 504 that the plurality of pipeline stages is not idle, the circuitry determines whether one or more overall performance metrics for the pipeline stages of the storage controller satisfy respective threshold values. The overall performance metrics can indicate, for example, an overall or end-to-end throughput for the pipeline stages of the storage controller or an overall number of pending commands waiting to be processed by the pipeline stages. If the performance metric or metrics are determined to satisfy the threshold value or values, the process of FIG. 5 then returns to block 504 to determine if the pipeline stages have become idle or inactive.

If the one or more overall performance metrics in block 508 do not satisfy the threshold values (e.g., too many pending commands or too low of an overall throughput), the circuitry in block 510 sets the frequencies of the clock signals for all the pipeline stages to the system frequency. The process of FIG. 5 then returns to block 504 to determine if the pipeline stages have become idle or inactive.

Those of ordinary skill in the art will appreciate with reference to the present disclosure that the order of blocks for the clock signal adjustment process of FIG. 5 may differ in other implementations. For example, the process of FIG. 5 in other implementations may immediately return from block 510 to block 508 to determine whether the one or more overall performance metrics have satisfied the threshold value or values.

As discussed above, the foregoing independent adjustment of clock signal frequencies for different pipeline stages of a storage controller can allow for improved power savings while better balancing delays among the pipeline stages. In addition, the processes and storage controllers of the present disclosure further conserve power by progressively reducing the frequencies of the clock signals for the pipeline stages and increasing the frequencies of the pipeline stages as needed by determined performance metrics.

Other Embodiments

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes processor circuitry or control circuitry to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, processor circuitry, and controller circuitry described in connection with the examples disclosed herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the circuitry may be any conventional processor circuitry, controller circuitry, microcontroller circuitry, or state machine. Processor circuitry or controller circuitry may also be implemented as a combination of computing devices, e.g., a combination of a DSP and a microprocessor, a plurality of microprocessors, an SoC, one or more microprocessors in conjunction with a DSP core, or any other such configuration.

The activities of a method or process described in connection with the examples disclosed herein may be embodied directly in hardware, in a software module executed by processor circuitry or controller circuitry, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to the processor circuitry or controller circuitry such that the circuitry can read information from, and write information to, the storage medium. In the alternative, the storage medium may be integral to processor circuitry or controller circuitry. The circuitry and the storage medium may reside in an ASIC or an SoC.

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive. In addition, the use of language in the form of "at least one of A and B" in the following claims should be understood to mean "only A, only B, or both A and B."

What is claimed is:

1. A storage controller, comprising:
   a plurality of pipeline stages configured to process data; and
   circuitry configured to:
      receive a system clock signal having a system frequency;
      determine at least one performance metric for one or more pipeline stages of the plurality of pipeline stages;
      generate a first clock signal having a first frequency for operation of a first pipeline stage of the plurality of pipeline stages;
      based at least in part on the at least one determined performance metric, generate a second clock signal having a second frequency for operation of a second pipeline stage of the plurality of pipeline stages, wherein the at least one determined performance metric indicates at least one of a throughput of commands processed by a previous pipeline stage relative to the second pipeline stage and a throughput of commands processed by a next pipeline stage relative to the second pipeline stage, and
      wherein the second frequency is less than the system frequency and differs from the first frequency; and
      operate the first pipeline stage at the first frequency using the first clock signal while operating the second pipeline stage at the second frequency using the second clock signal.

2. The storage controller of claim 1, wherein the at least one performance metric further indicates at least one of an overall throughput of commands processed by the plurality of pipeline stages, a throughput of commands processed by a current pipeline stage, an overall number of pending commands to be processed by the plurality of pipeline stages, a number of pending commands to be processed by the current pipeline stage, a number of pending commands to be processed by the previous pipeline stage, and a number of pending commands to be processed by the next pipeline stage.

3. The storage controller of claim 1, wherein the at least one performance metric further indicates at least one of a current throughput of processed commands and an average throughput of processed commands.

4. The storage controller of claim 1, wherein the circuitry is further configured to:
   determine that a performance metric for the second pipeline stage does not satisfy a threshold value; and
   in response to determining that the performance metric for the second pipeline stage does not satisfy the threshold value, increase the second frequency to the system frequency.

5. The storage controller of claim 1, wherein the circuitry is further configured to:
   determine that an overall performance metric for the plurality of pipeline stages does not satisfy a threshold value; and
   in response to determining that the overall performance metric does not satisfy the threshold value, set the frequency for the clock signal for each pipeline stage of the plurality of pipeline stages to the system frequency.

6. The storage controller of claim 1, wherein the circuitry is further configured to determine the first frequency using a different number of performance metrics than the number of performance metrics used to determine the second frequency.

7. The storage controller of claim 1, wherein the circuitry is further configured to determine the first frequency using at least one different type of performance metric than a performance metric used to determine the second frequency.

8. The storage controller of claim 1, wherein the circuitry is further configured to:
   decrease the second frequency by a predetermined frequency;
   determine a subsequent performance metric after decreasing the second frequency by the predetermined frequency; and
   determine whether to further decrease the second frequency by the predetermined frequency based at least in part on the subsequent performance metric.

9. The storage controller of claim 1, wherein the circuitry is further configured to:
   determine that the plurality of pipeline stages is idle; and
   in response to determining that the plurality of pipeline stages is idle, reduce the frequency of the clock signal for each pipeline stage of the plurality of pipeline stages by a predetermined frequency.

10. A method for operating a storage controller, the method comprising:
   receiving a system clock signal having a system frequency;
   determining at least one performance metric for one or more pipeline stages of a plurality of pipeline stages of the storage controller;
   generating, based at least in part on the system frequency, a first clock signal having a first frequency for operation of a first pipeline stage of the plurality of pipeline stages;

generating, based at least in part on the at least one determined performance metric, a second clock signal having a second frequency for operation of a second pipeline stage of the plurality of pipeline stages, wherein the at least one determined performance metric indicates at least one of a throughput of commands processed by a previous pipeline stage relative to the second pipeline stage and a throughput of commands processed by a next pipeline stage relative to the second pipeline stage, and wherein the second frequency differs from the first frequency; and operating the first pipeline stage at the first frequency using the first clock signal while operating the second pipeline stage at the second frequency using the second clock signal.

11. The method of claim 10, wherein the at least one performance metric further indicates at least one of an overall throughput of commands processed by the plurality of pipeline stages, a throughput of commands processed by a current pipeline stage, an overall number of pending commands to be processed by the plurality of pipeline stages, a number of pending commands to be processed by the current pipeline stage, a number of pending commands to be processed by the previous pipeline stage, and a number of pending commands to be processed by the next pipeline stage.

12. The method of claim 10, wherein the at least one performance metric further indicates at least one of a current throughput of processed commands and an average throughput of processed commands.

13. The method of claim 10, further comprising:
determining that a performance metric for the second pipeline stage does not satisfy a threshold value; and
in response to determining that the performance metric for the second pipeline stage does not satisfy the threshold value, increasing the second frequency to the system frequency.

14. The method of claim 10, further comprising:
determining that an overall performance metric for the plurality of pipeline stages does not satisfy a threshold value; and
in response to determining that the overall performance metric does not satisfy the threshold value, setting the frequency of the clock signal for each pipeline stage of the plurality of pipeline stages to the system frequency.

15. The method of claim 10, further comprising determining the first frequency using a different number of performance metrics than the number of performance metrics used to determine the second frequency.

16. The method of claim 10, further comprising determining the first frequency using at least one different type of performance metric than a performance metric used to determine the second frequency.

17. The method of claim 10, further comprising:
decreasing the second frequency by a predetermined frequency;
determining a subsequent performance metric after decreasing the second frequency by the predetermined frequency; and
determining whether to further decrease the second frequency by the predetermined frequency based at least in part on the subsequent performance metric.

18. The method of claim 10, further comprising:
determining that the plurality of pipeline stages is idle; and
in response to determining that the plurality of pipeline stages is idle, reducing the frequency of the clock signal for each pipeline stage of the plurality of pipeline stages by a predetermined frequency.

19. A storage controller, comprising:
a plurality of pipeline stages configured to process data; and
means for:
receiving a system clock signal having a system frequency;
determining at least one performance metric for one or more pipeline stages of the plurality of pipeline stages;
generating a first clock signal having a first frequency for operation of a first pipeline stage of the plurality of pipeline stages;
based at least in part on the at least one determined performance metric, generating a second clock signal having a second frequency for operation of a second pipeline stage of the plurality of pipeline stages, wherein the at least one determined performance metric indicates at least one of a throughput of commands processed by a previous pipeline stage relative to the second pipeline stage and a throughput of commands processed by a next pipeline stage relative to the second pipeline stage, and
wherein the second frequency is less than the system frequency; and
operating the first pipeline stage at the first frequency while operating the second pipeline stage at the second frequency.

20. The storage controller of claim 19, wherein the second frequency differs from the first frequency.

* * * * *